May 27, 1941.  O. L. STARR  2,243,263
ENGINE PISTON
Filed May 19, 1939
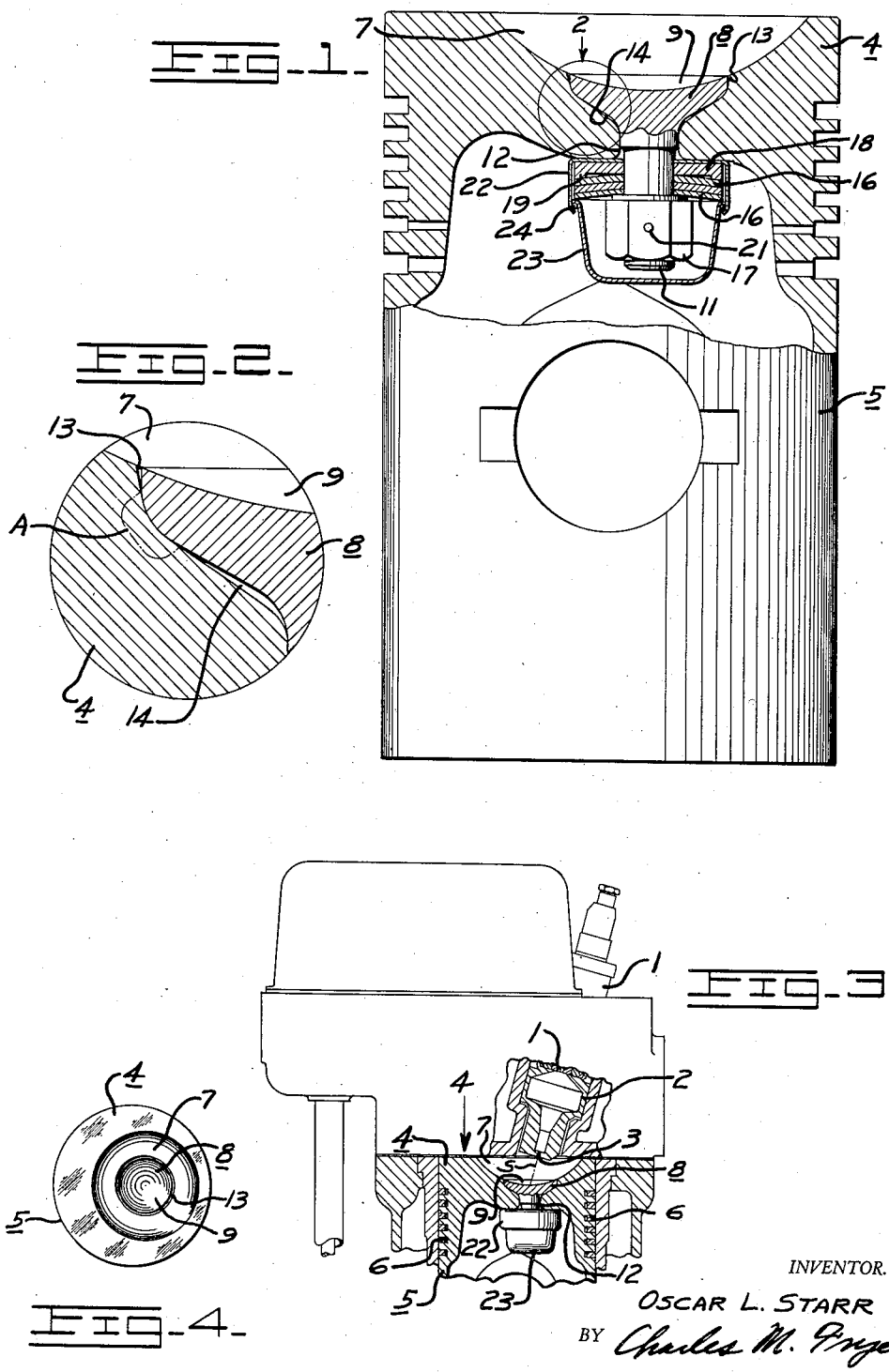
INVENTOR.
OSCAR L. STARR
BY Charles M. Fryer
ATTORNEY.

Patented May 27, 1941

2,243,263

UNITED STATES PATENT OFFICE 2,243,263

ENGINE PISTON

Oscar L. Starr, Mission San Jose, Calif., assignor to Caterpillar Tractor Co., San Leandro, Calif., a corporation of California Application May 19, 1939, Serial No. 274,502

2 Claims. (Cl. 309—9)

My invention relates to pistons for internal combustion engines, and more particularly to a piston construction adapted to withstand relatively high temperatures, as well as promote combustion and preclude cracking or deterioration of the head of a piston adapted for a compression ignition engine.

A compression ignition engine operates at much higher maximum temperatures and pressures than a spark ignition engine, and fuel is usually injected into the main combustion chamber of such compression ignition engine in a manner to cause the fuel stream or spray to strike the piston head always at the same location within the peripheral boundaries or extremities of the head. Because of the high maximum temperatures of such engine, the ignited fuel at such location results in a limited area which is materially hotter than the remainder of the piston head. For the purpose of quickly dissipating heat from such area, and from the periphery of the piston to minimize ring sticking, it is desirable to make the head as well as the body of the piston of a material having a relatively high heat conductivity, such as aluminum or aluminum alloys. Cast iron although of less heat conductivity than aluminum is also employed in some engines.

Such hot area is advantageous in one respect, because it promotes rapid and complete combustion of the fuel which strikes it, since it causes the fuel to vaporize and ignite completely more readily. However, with respect to the types of materials of relatively high heat conductivity desirable for the piston head, the hot area is undesirable because such materials are susceptible to chemical corrosion or deterioration at the relatively high temperature of the hot area. Such corrosion results in the formation of relatively small holes or fissures in which small particles of corroded material collect; and as the piston expands and contracts, stresses are set up which cause checking or cracking of the piston. The cracking or checking at the hot area also results from localized thermal stresses, as well as the chemical stresses caused by corrosion; the thermal stresses being more destructive. Such thermal stresses are due to the fact that when the head or a major portion thereof is formed as an integral unit, there is quite a difference in temperature and in changes in temperature, between the hot area and the areas immediately adjacent thereto. This tends to effect movement of the metal particles in such adjacent areas, creating the stresses which result in checking or cracking. Such undesirable effect is aided by the constant expansion and contraction of the head of the piston due to varying loads imposed on the engine, resulting in changes in temperature, and this causes metal fatigue rendering the metal less capable of withstanding the described thermal and chemical stresses.

The checking or cracking is more pronounced with respect to cast iron pistons than aluminum or aluminum alloy pistons because cast iron, having a lower heat conductivity than that of aluminum or aluminum alloy pistons, does not conduct the heat so rapidly from the hot area thereby accentuating the difference in temperature between the hot area and the remainder of the piston. My invention is designed to overcome the above described problems and has as its objects among others the provision of an improved piston construction which will prevent cracking or checking of the piston head, and at the same time promote combustion. Other objects of the invention will become apparent from a perusal of the following description thereof.

In general, the piston construction of my invention comprises the formation of an aperture in the head of the piston at the region or area upon which fuel is directed, which region normally forms the hot area, and the provision in such aperture of an insert or plug of corrosion and heat resistant material of relatively low heat conductivity. The insert has a limited area of surface to surface contact with the remainder of the piston head so as to be substantially insulated therefrom, and occupies a minor proportion of the total area of the piston head which is otherwise of material having a relatively high heat conductivity, such as aluminum or cast iron. In such arrangement, the aperture being at the hot area serves to reduce or relieve thermal stresses which are also relieved due to the fact that the insert or plug at the hot area is independent of or in other words molecularly free from the remainder of the piston head so as to be capable of independent expansion and contraction.

The insert, being of relatively low heat conductivity and being substantially insulated from the remainder of the piston head also serves to maintain a high temperature at the hot area, resulting in a hot spot which promotes combustion with consequent enhancement of engine efficiency. At the same time, since the insert occupies only a minor proportion of the piston head area, there is ample material of relatively high heat conductivity in the remainder of the poston head for rapid dissipation of heat to minimize ring sticking. Resilient means is provided for holding the insert on the piston head so as to allow independent expansion and contraction thereof against the action of such resilient means, and at the same time maintain sealing engagement between the insert and the remainder of the piston head.

Reference will now be made to the drawing for a more detailed description of the invention in which:

Fig. 1 is a vertical sectional view, partly in elevation, of the piston of my invention.

Fig. 2 is a magnified view of the portion of the structure encircled in Fig. 1, as indicated by arrow 2.

Fig. 3 is a fragmentary sectional elevation illustrating the piston of my invention in an engine.

Fig. 4 is a plan view of the head of the piston looking in the direction of arrow 4 in Fig. 3.

The principle of construction of my invention is applicable to any type of engine having the problems discussed above but for purposes of illustration, I have chosen it in a compression ignition engine of the precombustion chamber type manufactured by my assignee. In such engine, as is illustrated in Fig. 3, fuel is injected from fuel injection nozzle 1 into precombustion chamber 2 where it may become partially ignited or vaporized, from which precombustion chamber the fuel passes through single hole discharge orifice 3 in the discharge end of the precombustion chamber, and strikes the head 4 of piston 5 which has the usual piston rings 6; the main portion of the head being preferably of material of relatively high heat conductivity, such as aluminum or even cast iron, so as to dissipate heat rapidly for the reason previously explained. As indicated by broken line S, fluid emitted from precombustion chamber 2 will always first strike head 4 on the same area.

A crater or cavity 7 is formed in head 4 and provides a part of the total volume of the main combustion chamber of the engine. Such crater may be located at varying locations in the main combustion chamber and assume varying shapes designed to promote uniform combustion, depending upon varying factors well known in the art. In the particular engine illustrated, crater 7 is located off center because the axis of the precombustion chamber is also off center, and is preferably a segment of sphere as such contour has been found to distribute the burning gases uniformly which is desirable for efficient engine operation.

At the location where the fuel, as indicated by broken line S, is directed against the piston head and which forms the previously mentioned hot area, I provide the removably mounted insert or plug 8 of my invention, which is located within the extremities or peripheral boundary of crater 7. Such insert is of heat and corrosion resistant metal of relatively low heat conductivity, adapted to withstand the deteriorating action of burning fuel; and any suitable material may be employed for this purpose. There are many steel alloys which have the desired characteristics, and of these the chromium nickel steel alloys, known as 18—8 chromium nickel stainless steels (S. A. E. 30905 and S. A. E. 30915) are very suitable. I preferably employ, however, what is known in the trade as "silchrome" steel. The heat conductivity of a head of aluminum alloy generally employed in pistons will run about six and one-half to ten (6.5 to 10) times that of the material of the insert, and a gray cast iron head about two and one half (2.5) times that of such insert.

Therefore, aluminum is preferred to cast iron for the material of the head because it dissipates heat more rapidly to thereby minimize ring sticking to a greater degree. However, with respect to both cast iron and aluminum, the material of the insert has a relatively low heat conductivity which consequently results in concentration of the heat at the insert during the compression or working stroke of the piston to cooperate in providing the desired hot spot at such time. Aluminum is also preferred to cast iron for the piston head because, although the specific heats of the insert and cast iron are about the same, the specific heat of the generally employed aluminum alloy is about one and one-half (1.5) times that of the insert, and the specific gravity of the insert is over two and one-half (2½) times that of the aluminum alloy. As a result the insert is capable of storing about eighty-five percent (85%) more heat units than the same volume of the aluminum alloy, which is advantageous for promoting the hot spot.

Insert 8 is formed with a cavity 9 of a shape adapted to complement the general shape of crater 7, and its surface exposed to the main combustion chamber occupies a minor proportion of the total area of crater 7, and consequently the total area of the piston head. A stud 11 on insert 8 passes through aperture 12 in the piston head and provides means for securing of the insert in the piston head; the aperture 12 as previously explained cooperating to relieve thermal stresses in the head. Such stud may be of the same material as the head of the insert and thereby be integral therewith but because the material of the insert head is relatively expensive it may be desirable for economy to have such stud of other cheaper material secured to the head of the insert.

As can be seen more clearly from Fig. 2, the head of insert or plug 8 is in peripheral surface to surface contact with the adjacent material of the head of the piston, to thereby provide a seal between the insert and such adjacent material so as to preclude loss of compression which would otherwise occur if leakage were to obtain through the joint between the insert and the adjacent material of the piston head. However, such sealing contact is only along a limited intermediate peripheral area A, to thus provide annular insulating space 13 above said sealing contact area A and annular insulating space 14 below such contact area A. As a result, the insert is substantially insulated and heat will not be rapidly dissipated therefrom but will be concentrated thereon, and thereby the insert will be maintained hot to promote combustion. In this connection, stud 11 is of insufficient diameter to have a fit in the material about aperture 12 sufficiently tight to cause efficient heat transfer relationship therewith, the fit being merely sufficiently close to effect proper centering of the insert. Thus, only a minor proportion of the heat will be transferred through the stud, which is desirable for maintaining the hot spot.

There will be a marked difference in temperature between the temperature of the insert and the temperature of the remainder of the piston head, which will result in a marked difference in the degree of expansion and contraction between the insert and the remainder of the piston head, and such difference in expansion and contraction will be accentuated because of the different materials. However, the insert, being independent of or molecularly free from the remainder of the piston head, it can expand or contract independently to preclude checking or cracking. To maintain the sealing engagement at area A and yet allow relative thermal movements between the insert and the remainder of the piston head, I provide means for resiliently locking or holding the insert in position, and provide a special joint construction between the insert and the remainder of the head. With reference to the joint, the sealing contact at area A is along a relatively short or limited arc generally inclined with respect to the axis of the piston, as this will allow relative axial sliding movements without disruption of the seal.

The resilient locking or holding means for maintaining the sealing contact, comprises individual leaf springs 16 which are interposed between a retaining member in the form of nut 17 screwed onto stud 11 and the under side of the head of the piston; the springs abutting against washer 18 which is adjacent the under side of the head of the piston. Such washer 18 has a peripheral flange 19 which causes bowing of the springs 16, and enables tension to be applied thereto when the nut 17 is screwed against them. In assembling the insert, the springs are placed under a predetermined tension by nut 17 so as to hold the insert in position under a predetermined tension suitable for the particular environment under which the insert may be employed to allow for correct relative movement between it and the remainder of the piston head; and the nut 17 is then locked fixedly in position on stud 11 by means of pin 21. From the preceding, it is seen that by virtue of the resilient holding of insert 8 on the head of the piston, free relative movements can obtain between the insert and the head of the piston; and inasmuch as the area of contact between the insert and the head of the piston is generally inclined with respect to the axis of the piston, the seal between the insert and the piston will be maintained.

To protect the means which holds the insert in position from being gummed up by carbon deposit, I preferably employ shield means. Such shield means comprises cup-shaped member 22 held between washer 18 and the under side of the head of the piston, and which encloses washer 18 and springs 16, and cup-shaped member 23 enclosing the nut 17 and the end of stud 11. Members 22 and 23 are removably held together through split snap ring 24. The shield means although desirable for the purpose described is not necessary.

Although in the preferred construction of my invention, insert 8 is of heat and corrosion resistant material, as well as material which is also of relatively low heat conductivity, certain advantages of my invention may be obtained with other materials. For example, the described constructional mounting of the insert will obviate checking resulting from thermal stresses because it allows independent expansion and contraction of the insert, irrespective of the material employed. The insert may be made of high heat conductivity, and the insulation alone tends to create a hot spot but not as efficient a one as obtains by the use of the preferred material. Also, the material might be one which would not be heat and corrosion resistant in the environment under discussion, and still provide the hot spot, but then the material would be subject to deterioration by the burning fuel. Nevertheless, the latter arrangement would provide an economical advantage, as the insert would be replaceable at a lower cost than the entire piston.

I, therefore, claim as my invention:

1. A piston comprising a head having an aperture therein and an insert in said aperture in sealing engagement intermediate its ends with the remainder of said head along a limited area inclined with reference to the axis of said piston and constructed of heat resistant material having a heat conductivity relatively low compared to that of the remainder of said head, and a shank portion on said insert extending through said aperture; and means resiliently holding said insert in position to allow relative thermal movements between said remainder and said insert while maintaining said sealing engagement comprising a flanged washer about said shank portion and abutting against the under side of said piston head, a retaining member on said shank portion, and a leaf spring bowed between said retaining member and the flange of said washer.

2. A piston comprising a head having an aperture therein and an insert in said aperture in sealing engagement intermediate its ends with the remainder of said head along a limited area inclined with reference to the axis of said piston and constructed of heat resistant material having a heat conductivity relatively low compared to that of the remainder of said head, and a shank portion on said insert extending through said aperture; means resiliently holding said insert in position to allow relative thermal movements between said remainder and said insert while maintaining said sealing engagement comprising a flanged washer about said shank portion and abutting against the under side of said piston head, a retaining member on said shank portion, and a leaf spring bowed between said retaining member and the flange of said washer; and shield means about said holding means to protect said holding means against carbon deposit.

OSCAR L. STARR.